(12) United States Patent
Lloyd

(10) Patent No.: US 8,789,013 B1
(45) Date of Patent: Jul. 22, 2014

(54) ORDERED EXECUTION OF EVENTS IN A DATA-DRIVEN ARCHITECTURE

(75) Inventor: Robert F. Lloyd, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1642 days.

(21) Appl. No.: 11/467,850

(22) Filed: Aug. 28, 2006

(51) Int. Cl.
*G06F 9/44* (2006.01)
*G06F 9/45* (2006.01)

(52) U.S. Cl.
USPC ........... 717/107; 717/106; 717/120; 717/121; 717/151

(58) Field of Classification Search
CPC combination set(s) only.
See application file for complete search history.

(56) References Cited

U.S. PATENT DOCUMENTS

| | | | |
|---|---|---|---|
| 5,485,620 A * | 1/1996 | Sadre et al. | 717/162 |
| 5,841,656 A | 11/1998 | Taruishi | |
| 6,006,247 A | 12/1999 | Browning et al. | |
| 6,046,739 A | 4/2000 | MacPhail | |
| 6,272,672 B1 | 8/2001 | Conway | |
| 6,601,233 B1 * | 7/2003 | Underwood | 717/107 |
| 7,032,226 B1 | 4/2006 | Nemirovsky et al. | |
| 7,120,913 B2 * | 10/2006 | Kawase | 718/107 |
| 7,644,392 B2 * | 1/2010 | Geipel et al. | 717/121 |
| 7,689,994 B2 * | 3/2010 | Vronay et al. | 717/105 |
| 8,239,848 B2 * | 8/2012 | Ghercioiu et al. | 717/151 |
| 8,464,205 B2 * | 6/2013 | Chaar et al. | 717/106 |
| 8,527,937 B2 * | 9/2013 | Bertelrud et al. | 717/120 |
| 8,572,576 B2 * | 10/2013 | Elvanoglu et al. | 717/120 |
| 8,612,931 B2 * | 12/2013 | Bhandar et al. | 717/106 |
| 8,635,596 B2 * | 1/2014 | Sanghvi et al. | 717/120 |
| 2003/0233485 A1 | 12/2003 | Khan | |
| 2003/0237018 A1 * | 12/2003 | Baba | 714/4 |
| 2004/0236684 A1 * | 11/2004 | Yan | 705/40 |
| 2005/0166179 A1 * | 7/2005 | Vronay et al. | 717/105 |
| 2006/0090165 A1 | 4/2006 | Martin et al. | |
| 2006/0159012 A1 * | 7/2006 | Yoshimoto et al. | 370/220 |
| 2008/0059947 A1 * | 3/2008 | Anand et al. | 717/107 |
| 2008/0098351 A1 * | 4/2008 | Weatherhead et al. | 717/107 |
| 2012/0089499 A1 * | 4/2012 | Balthaser | 717/107 |

OTHER PUBLICATIONS

Leon Ljunggren; High Performance Industrial Diagnostic Systems; 2008; retrieved online on Mar. 4, 2014; pp. 1-46; Retrieved from the Internet: <URL: http://uu.diva-portal.org/smash/get/diva2:158953/FULLTEXT01.pdf>.*

Ramon Piedrafita and Jose Luis Villarroel; Evaluation of Sequential Function Charts Execution Techniques. The Active Steps Algorithm; IEEE; 2008; retrieved online on Mar. 4, 2014; pp. 74-81. Retrieved from the Internet: <URL: http://ieeexplore.ieee.org/stamp/stamp.jsp?tp=&arnumber=4638376>.*

Jonathan E. Cook and Alexander L. Wolf; Discovering Models of Software Processes from Event-Based Data; ACM 1998; retrieved online on Mar. 4, 2014; pp. 215-249; Retrieved from the Internet: <URL: http://delivery.acm.org/10.1145/290000/287001/p215-cook.pdf?>.*

* cited by examiner

*Primary Examiner* — Thuy Dao
*Assistant Examiner* — Hanh T Bui
(74) *Attorney, Agent, or Firm* — Amin, Turocy & Watson, LLP

(57) ABSTRACT

An event execution system comprises an ordering component that receives multiple events and dynamically organizes the multiple events based at least in part upon a predefined organization of devices affected by the multiple events. The system can additionally include an execution component that executes the multiple events with respect to the devices according to the organization of the multiple events.

22 Claims, 11 Drawing Sheets

ORDERED EXECUTION OF EVENTS IN A DATA-DRIVEN ARCHITECTURE

TECHNICAL FIELD

The claimed subject matter relates generally to system control, and, more particularly, to enabling events to be executed in a particular sequence in a data-driven architecture.

BACKGROUND

Due to advances in computing technology, businesses today are able to operate more efficiently when compared to substantially similar businesses only a few years ago. For example, high speed data networks enable employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, activities that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases (or web services referencing databases) that are accessible by system/process/project managers on a factory floor. For instance, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

Automatically performing actions based upon changes in data (e.g., changes in process variables, alterations of an operator-related parameter, . . . ) is often computationally expensive and non-trivial. In an example, devices that alter their behavior based upon data changes in a system typically poll several sources of data to monitor for such data changes. For instance, many industrial controllers can control one or more processes through use of ladder logic, wherein each ladder logic program can include thousands of rungs. When a device polls the ladder logic for alterations with respect to particular portions of data, each rung of the ladder logic is scanned sequentially. Data flow architectures that utilize polling in such a manner are predictable and easy to control, but are associated with a significant amount of overhead. For example, if a ladder logic program is quite large and several devices must poll each rung of the ladder logic program, a significant amount of computational resources will be required to effectuate the polling.

In other systems, software can be "wired up" in such a manner that data changes cause data packets to be pushed to consuming devices. Thus, if a process variable that effects operation of a device is altered (e.g., through an operator depressing a push button), a flag, data, or other suitable notification can be automatically provided to the device. These architectures can be problematic when complex control is desirably implemented, such as when signals are combined or feedback is involved. For instance, if one data path is faster than another, then a transient state can exist. Further, if feedback is employed, then altered data can drive itself into an infinite loop, such that other data changes cannot propagate throughout a system.

SUMMARY

The following presents a simplified summary of subject matter described in more detail herein in order to provide a basic understanding of some aspects of such subject matter. This summary is not an extensive overview, and is not intended to identify key/critical elements or to delineate the scope of the subject matter described herein. Its sole purpose is to present some concepts in a simplified form as a prelude to the more detailed description that is presented later.

Events within data driven architectures can be executed in undesirable orders when complex control is implemented, such as combination of data paths, feedback loops, etc. An event, as utilized herein, represents an alteration in a data value somewhere within a system, such as a process value, a state of an operator control (e.g., when an operator depresses a button, a state associated therewith changes from un-depressed to depressed). The subject matter described herein relates to properly ordering events within data driven architectures, such that events are executed in a proper order when complex control is desired. Thus, a net data change can be reacted to, rather than individual data alterations. Events can be actions that affect devices or cause devices to operate in a certain manner. For instance, an operator depressing a push button can be an origin of several events with respect to multiple devices. To enable this ordering of events, devices can be organized (e.g., based upon how software is wired up between devices) and assigned values (numbers, letters, a combination thereof, etc.) based upon how the devices desirably interoperate. For instance, a device can be a human-machine interface graphical object, a mathematical device such as an adder, multiplier, and the like, a sensor, a converter, and other suitable devices. In many instances, devices should operate in a certain order (e.g., a converter may desirably operate before an adder, which may desirably operate before a graphical device that displays a resultant value), and thus devices can be organized in a manner that is representative of how they should act.

Thus, upon receipt of an event, a device associated with such event can be analyzed to determine a location within an organization of devices, and the event can be selectively placed amongst other events based at least in part upon such organization of devices. This arrangement of events ensures that the events will be executed in a proper order (e.g., devices will act in an appropriate order). Additionally, arrangement of events within a data driven architecture enables reduction of overhead with respect to conventional scanning systems while retaining benefits of predictability and reliability associated therewith.

In another aspect, events can be pulled from a queue or pushed from a queue to a component that executes the events. A received event can then be associated with a device and placed amongst a plurality of events within the queue in an appropriate location, such that the execution component will execute the received event in a desired order. Still further, multiple queues can be employed, such that a first queue can act as an active queue while a second queue can act as a standby queue. With more specificity, when an event is received, a most recently executed (or currently executing) event can be analyzed to determine whether the received event is desirably executed before or after the most recently executed (or currently executing event). If it is determined that the received event desirably executes after the most recently executed event, then the received event can be placed within the active queue. If it is determined that the received event desirably executes before the most recently executed event, then the received event can be placed within the standby queue. In an example, such determination can be made by a device that consumes the event (rather than the event itself or a component that generated the event (data change)). When there are no further events remaining within the active queue, the roles of the active queue and the standby queue can be reversed (e.g., the active queue becomes the standby queue and the standby queue becomes the active queue).

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
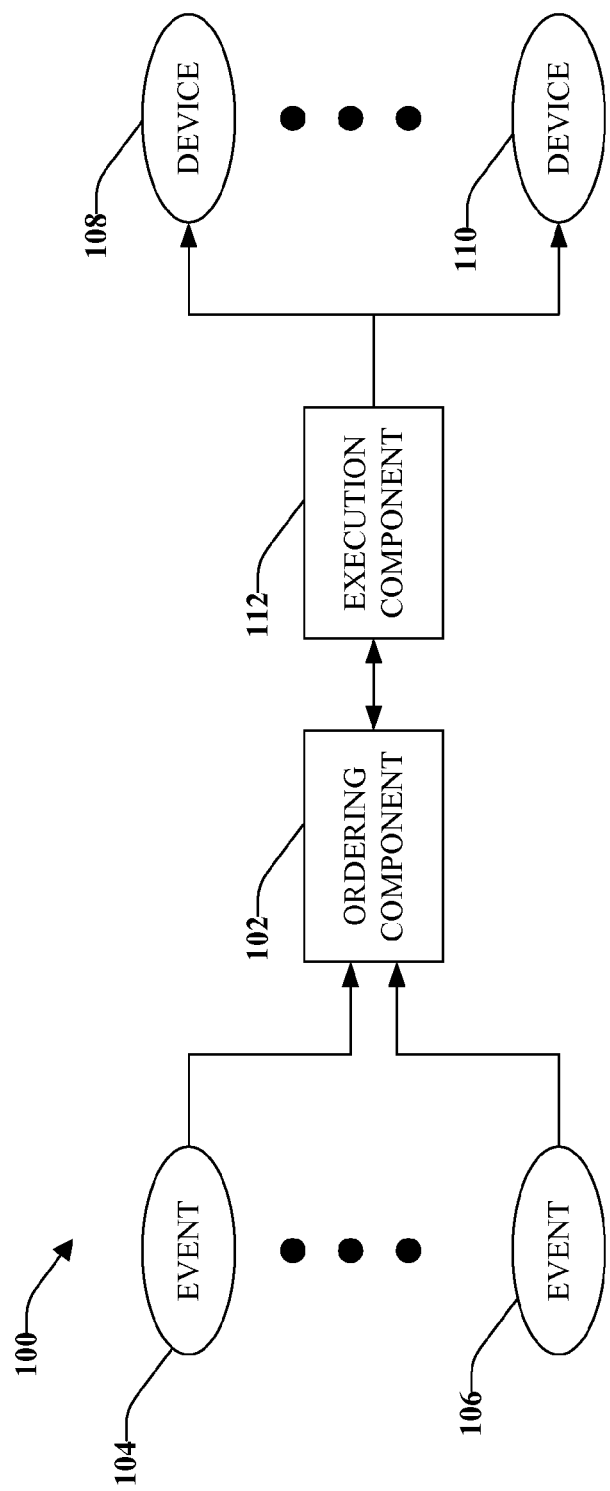
FIG. 1 is a high-level block diagram of a system that facilitates ordering events for execution in a system that utilizes a data-driven architecture.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Furthermore, aspects of the disclosed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that facilitates executing functions with respect to one or more devices in a particular order, such that overhead associated with conventional architectures that are associated with scanning is reduced without compromising predictability and reliability. For example, the system 100 can reside within an industrial controller (such as a programmable logic controller), a human-machine interface (HMI), or a combined controller/HMI. Additionally, the system 100 is not limited to an industrial environment, and can operate in devices such as a personal computer, a portable phone, a personal digital assistant (PDA), etc. The system 100 includes an ordering component 102 that receives an indication that one or more events (representative of one or more data changes) have occurred. An event, for instance, can be associated with a data change, such as an alteration of a process variable. Such alteration of the process variable can have an effect on several devices, and the alteration can cause an event (other data changes) to be generated with respect to each of the several devices. Thus, one change in a process variable can affect multiple devices (e.g., be events with respect to multiple devices). Additionally, an event can be associated with a human action that causes a change in data, such as the depression of a push button or other suitable user action. Again, the change in data resultant from user action can cause multiple devices to react, such as causing an adder to sum different values, causing a human-machine interface graphical icon to be redrawn, etc. Thus, the user action can be associated with multiple events with respect to several different devices.

Still further, events can be dependent upon one another and/or initiate other events. For example, a sensor can initiate a change in data resultant from a sensed change in temperature, thereby desirably causing a redraw of a graphical depiction. Prior to performing the redraw, however, temperatures may need to be re-sensed, converted, and summed. The change in data can cause multiple events, including an event associated with a sensor, an event associated with a converter, an event associated with an adder, and an event associated with a redrawing device (wherein the event can be associated with instructions for a device to perform certain functions). It may be imperative, however, that devices perform particular functions in a certain order, as redrawing prior to conversion may cause an incorrect value to be displayed to a user, can result in an infinite loop, and/or other undesirable outcomes.

Accordingly, the ordering component 102 can receive one or more events 104-106 and order the events 104-106 based at least in part upon a predefined organization of multiple devices 108-110. The devices 108-110 can be hardware, software, and/or a combination thereof. For instance, the devices 108-110 can include sensors, graphical icons, software functions (such as an adder, multiplier, etc.). Additionally, the devices 108-110 can be associated with an indication of priority (e.g., numbers, letters, . . . ), such that events associated with certain devices are executed in a particular order, wherein "execution" of an event refers to a device performing a particular function associated with the event. For instance, in a conventional data-driven system, events are pushed to devices, and the events are executed with respect to the devices in the order that the events are received. In some instances, however, order of receipt of events may not correspond to an order with respect to which the events should be executed. Based upon an organization of the devices (e.g., numbers assigned to the devices 108-110), the ordering component 102 can organize the events 104-106 such that one or more of the devices 108-110 execute the events in the proper order.

An execution component 112 is configured to execute the events 104-106 in an order determined by the ordering component 102. For example, the ordering component 102 can order the events 104-106 such that the event 106 should be executed first with respect to device 108 and followed by event 104 being executed by device 110. The execution component 112 can then execute the events such that the device 110 performs a particular function followed by the device 108 performing a particular function.

In a still more detailed example, an operator may depress a push button, which can desirably cause two different temperature readings to be undertaken by two sensors (which determine temperatures in Celsius). Similarly, sensors can produce a data alteration based upon a sensed changes in temperature. Thereafter, the two temperatures are desirably converted to the Fahrenheit scale, summed by an adder, averaged by a dividing device, and then a graphical device that illustrates the average temperature desirably redraws a graphical icon indicating an average value. It can be discerned that order of execution of the events is important, as conversion of the temperatures should be completed prior to summing, summing should be completed prior to averaging, and averaging should be completed prior to redrawing. In conventional scanning systems, all sources of data in a system can be scanned to ensure that the events are executed in a proper order, wherein such scanning is associated with a large amount of overhead (as tens of thousands of data sources may be scanned even though a vast majority of such sources are irrelevant).

As described above, however, the events may not be received in a proper order. For instance, an event received first in time may be related to obtaining a first sensed value, an event received second in time may be related to converting the sensed value from Celsius to Fahrenheit, an event received third in time may relate to adding two sensed temperatures, an event received fourth in time may relate to redrawing a graphical icon, etc. Conventional data-driven architecture systems execute the events in such an order, which can result in one or more errors or improper values being displayed. More specifically, the adder would be adding the first temperature (converted) with a previous temperature in memory or a zero value (wherein such temperature may or may not be converted), and the graphical device would attempt to redraw the temperature prior to being averaged (e.g., an obsolete average may be redrawn or an error may occur).

The system 100 mitigates occurrences of these and similar errors by ordering events prior to execution thereof, wherein the order is based at least in part upon an organization of the devices 108-110. Continuing with the above example, the two sensors may be associated with numbers (or other indicia) that indicate that events associated therewith should be executed prior to events associated with the converters. Similarly, the adder can be associated with indicia that indicate that events associated with the adder should not be executed until after the events associated with the converters are executed. Therefore, the events will be executed in an appropriate order by the execution component 112, and less overhead will be required when compared to conventional scanning systems.

It is also to be appreciated that the ordering component 102 can receive a single event and place such event with respect to at least one other event in an appropriate order. Thus, for instance, the ordering component 102 can receive an event that causes two values to be added, and such event can be dynamically placed by the ordering component 102 after an event that causes at least one of the two values to be converted to a different format. In an example, this ordering can be determined by consuming devices.

Figure 2:
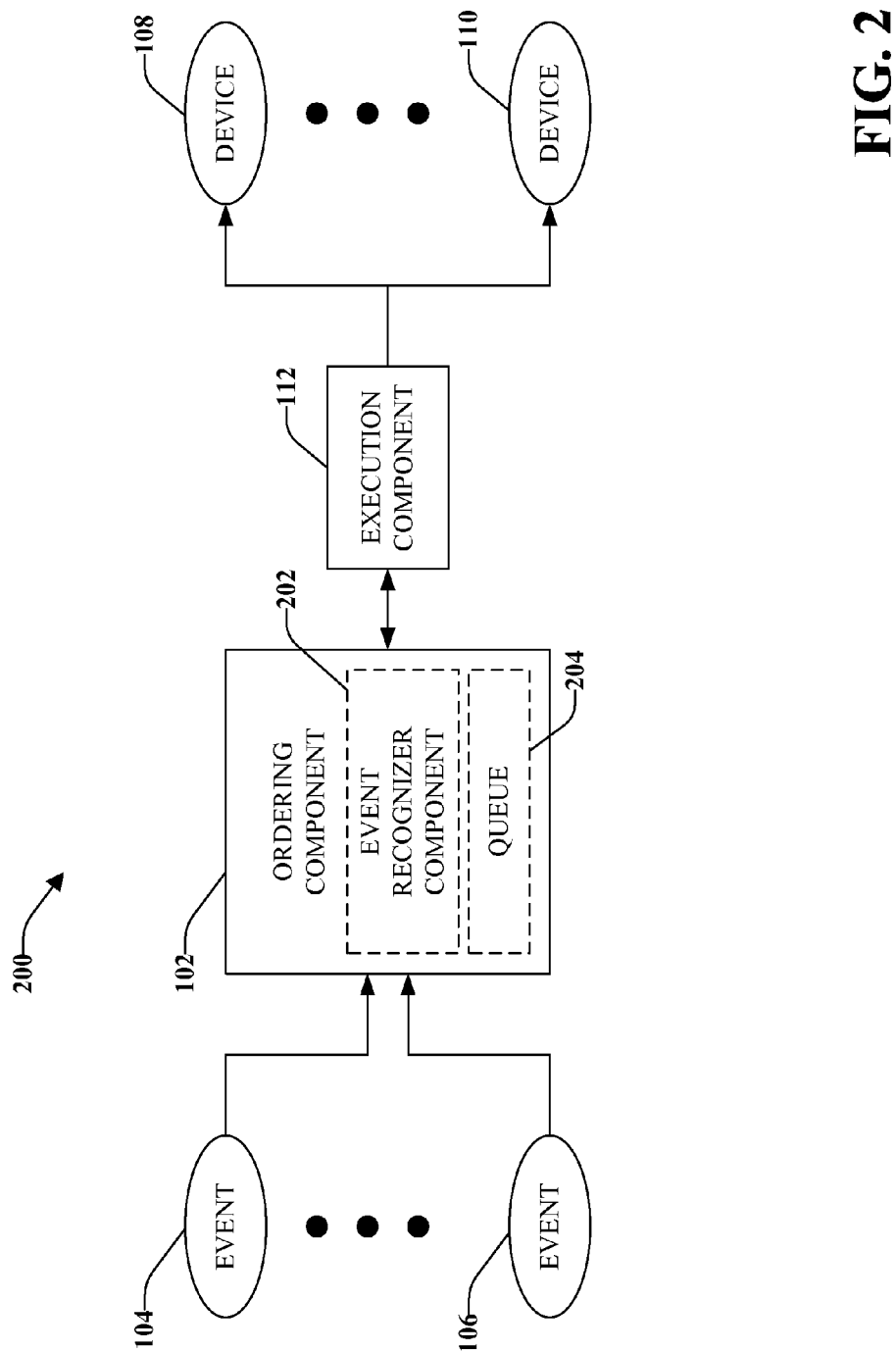
FIG. 2 illustrates a system for automatically and dynamically placing a received event within a queue at an appropriate location with respect to at least one other event.

Now referring to FIG. 2, an event execution system 200 is illustrated. The system 200 includes the ordering component 102 that receives the plurality of events 104-106 upon an alteration occurring with respect to the system 200, such as a data change associated with a depression of a push button, change in a process variable, an alarm, an interrupt, and/or the like. The ordering component 102 additionally includes an event recognizer component 202 that can determine which of the devices 108-110 are associated with the events 104-106. Once this determination is made, the ordering component 102 can place the events 104-106 in a particular order within a queue 204. Unlike conventional queues, which are typically associated with a first in first out protocol, the ordering component 102 can place events in the queue with relation to other events that are already within the queue.

It is to be understood, however, that data change events are not all injected at a certain "beginning" point in time. Rather, a few process variables can change, and such events are processed by devices or components of a system. These devices in turn inject other data changes into a system. Thus, any component/device can produce or consume a data change event, and data change events are generally produced/consumed throughout the flow of data in a system. Thus, data changes are produced as a product of data flowing through a system.

Continuing with the example provided above, the queue 204 can include the event associated with sensing a first temperature, the event associated with sensing the second temperature, and summing the two temperatures (in that order). Subsequently, the ordering component 102 can receive events relating to converting the first and second temperatures from the Celsius scale to the Fahrenheit scale, and can place the events in the queue 204 between the sensing of the temperatures and the summing of such temperatures. The execution component 112 can retrieve events from the queue 204 according to the order that the events are arranged within the queue 204, and can execute the events with respect to the devices 108-110 associated therewith.

Figure 3:
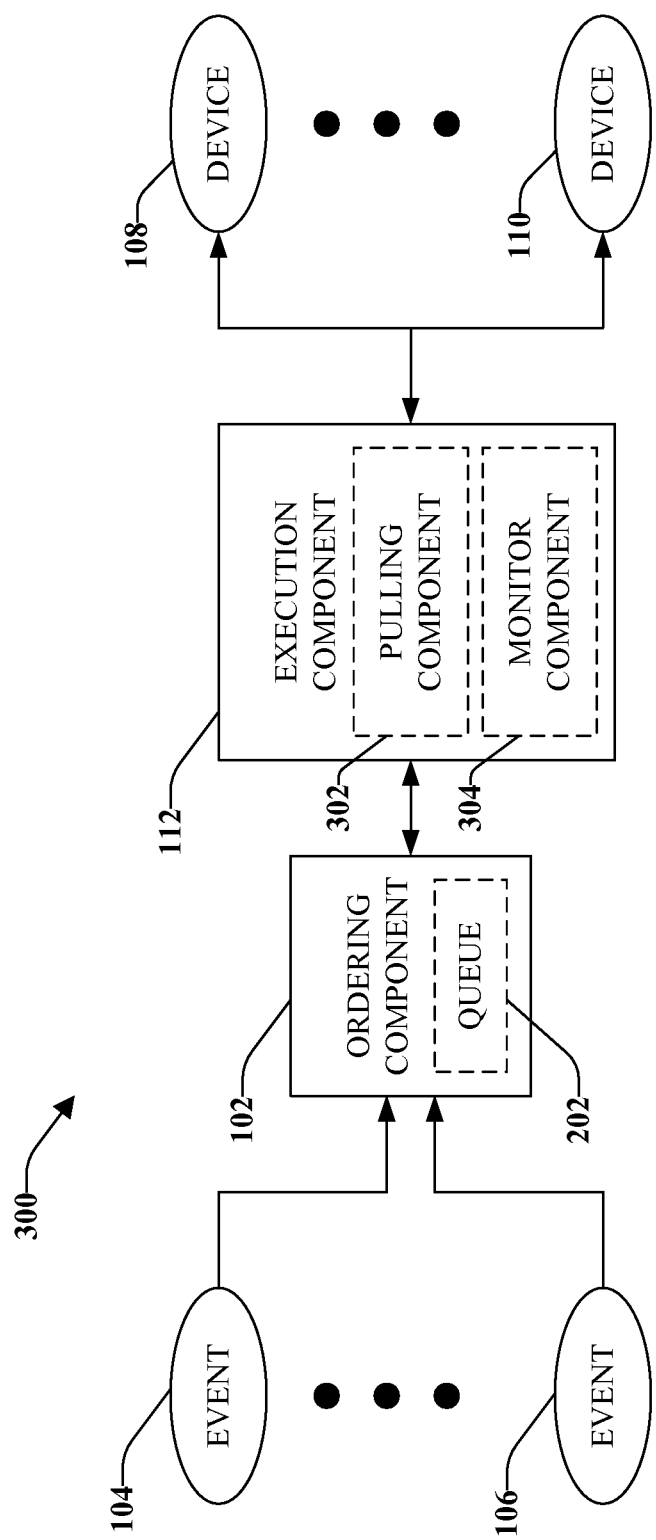
FIG. 3 illustrates a system that facilitates ensuring that an event has been properly executed prior to initiating execution of another event.

Turning now to FIG. 3, a system 300 that facilitates execution of events in a particular order is illustrated. The system 300 includes the ordering component 102 that receives the plurality of events 104-106 and places such events in an appropriate order within the queue 202. As described above, the ordering of the events can be based at least in part upon a predetermined organization of the devices 108-110. The execution component 112 includes a pulling component 302 that pulls events from the queue 202 in an order determined by the ordering component 102. For instance, once an event has been executed with respect to one or more of the devices 108-110, the pulling component 302 can pull a next event from the queue 202. Once the pulling component 302 pulls an event from the queue 202, the execution component 112 can execute the event with respect to a particular device. In another example, rather than the execution component 112 pulling from the queue 202, events can be automatically pushed to the execution component 112 (e.g., through employment of a pushing component (not shown)).

The execution component 112 further includes a monitor component 304 that ensures that a device has responded according to an executed event. For instance, if the pulling component 302 pulls an event from the queue 202 that causes the device 108 to convert a temperature, the pulling component 302 can wait to pull a next event from the queue 202 until the monitor component 304 receives an indication that the device 108 has responded appropriately to the event. Similarly, events may not be pushed to the execution component 112 until such component 112 indicates that a device has responded accordingly. The devices 108-110, for example, can be configured to provide an acknowledgement to the monitor component 304 when their behavior has been properly altered due to execution of one or more events. In another example, the monitor component 304 can actively monitor the devices 108-110 for changes in behavior or completion of an action.

Figure 4:
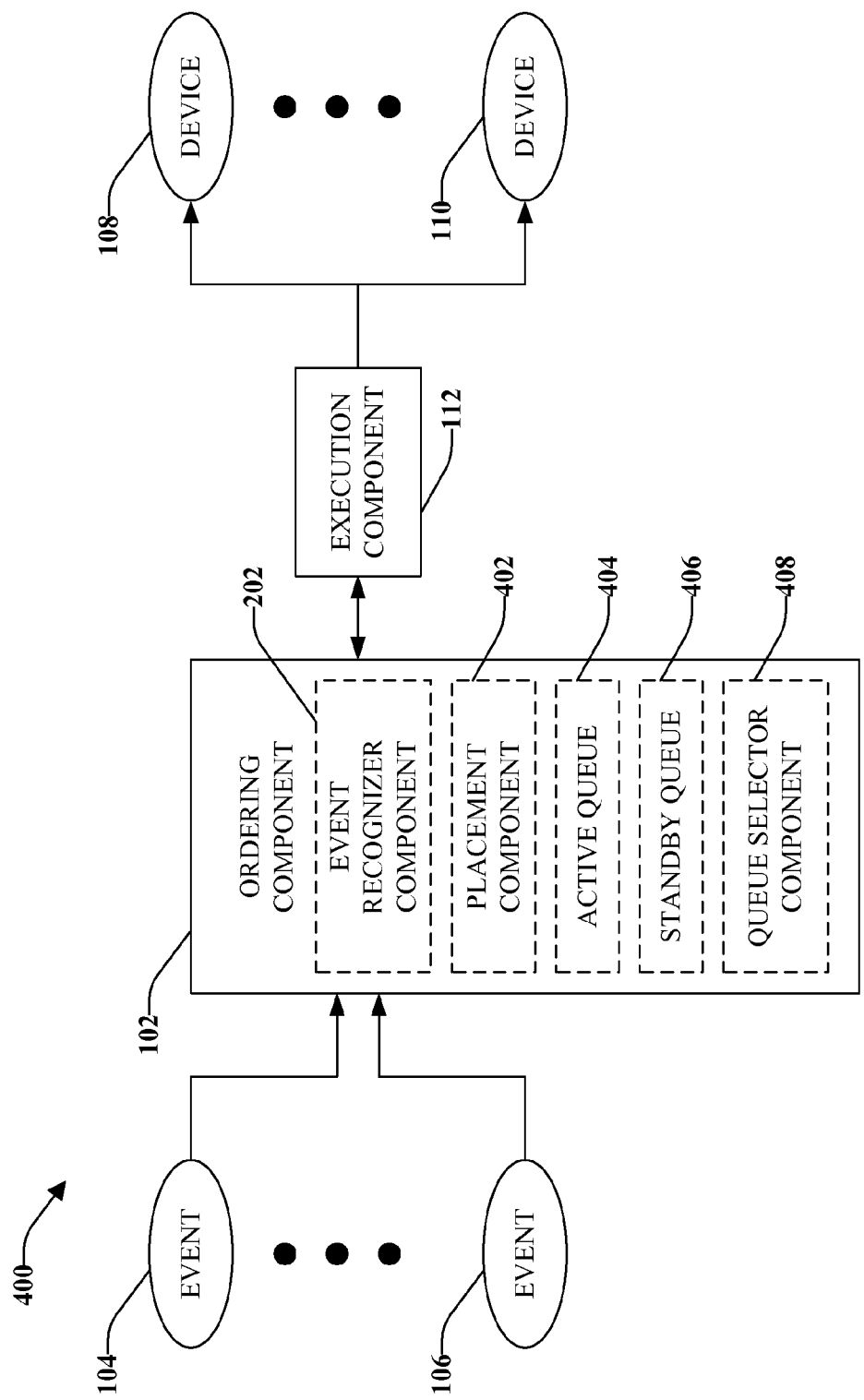
FIG. 4 illustrates usage of multiple queues to ensure that events are not executed out of a desired order.

With reference now to FIG. 4, an event execution system 400 is illustrated. The system 400 includes the ordering component 102, which receives the plurality of events 104-106 (wherein the events can be received in any order). Events can often be received in an order that would cause an undesirable condition to occur, such as a race condition. The ordering component 102 can include the event recognizer component 202, which can recognize events based upon a number or other identifying indicia associated with device(s) that act based upon the events. For example, the device 110 can be associated with a number, letter, combination thereof, or other suitable indicia. Similarly, the device 108 (and other devices) can be assigned indicia that identifies (and orders). Events that affect the devices 108-110 can then be ordered based upon an ordering of the devices 108-110.

The ordering component 102 is also associated with a placement component 402, which can place received events in one of an active queue 404 and a standby queue 406, depending upon a currently or most-recently executed event. Utilization of the active queue 404 and the standby queue 406 can ensure that events are not executed out of a desired order. For instance, the active queue 404 can include unexecuted events 4, 5, 9, and 12, and the event recognizer component 202 can determine that the ordering component 102 has received an event that is desirably executed between events 9 and 12 (e.g., an event 11). The placement component 402 can place the received and recognized event within the active queue 404 between events 9 and 12.

In another example, the active queue 404 can include events 19, 21, 30, and 45, and the execution component can have most recently executed event 16 (e.g., pulled or pushed event 16 from the active queue 404 and executed such event with respect to a particular device). The ordering component 102 may then receive another event that is recognized as being upstream from a most recently executed event (e.g., event 10). The placement component 402, rather than placing the event at the front of the active queue 404 (and causing events to be executed out of a desired order), can place the event in the standby queue 406. The execution component 112 can then continue to receive pushed events (or pull events) from the active queue 404 and execute such events, and the placement component 402 can place received events in an appropriate queue. With more specificity, the placement component 402 can place "downstream" events (events that are ordered after a currently or most recently executed event) in the active queue 404 and can place "upstream" events (events that are ordered before a currently or most recently executed event) within the standby queue 406.

The system 400 can additionally include a queue selector component 408, which can change the active queue 404 to the standby queue 406 and the standby queue 406 to the active queue 404. More particularly, when the execution component 112 has executed each event within the active queue 404, the queue selector component 408 can redirect the execution component 112 to the standby queue 406 (thereby rendering such queue as being active). Thus, the system 400 can act as a scanning system without being associated with overhead associated with conventional scanning systems. For instance, if no events have occurred, resources allocated to the system 400 can be allocated to different tasks. Further, the system 400 can be altered such that only a single queue is utilized. For example, if a downstream event is received, it can be placed at the end of the queue, thus creating a loop of events to be executed. Additionally, it is to be understood that while some components are illustrated as residing within other components, each component can be separate and/or a subset of components can reside within other components and can operate in conjunction to act as the illustrated system 400. Further, the claims are not intended to be limited by the arrangement of components shown in the drawings.

Figure 5:
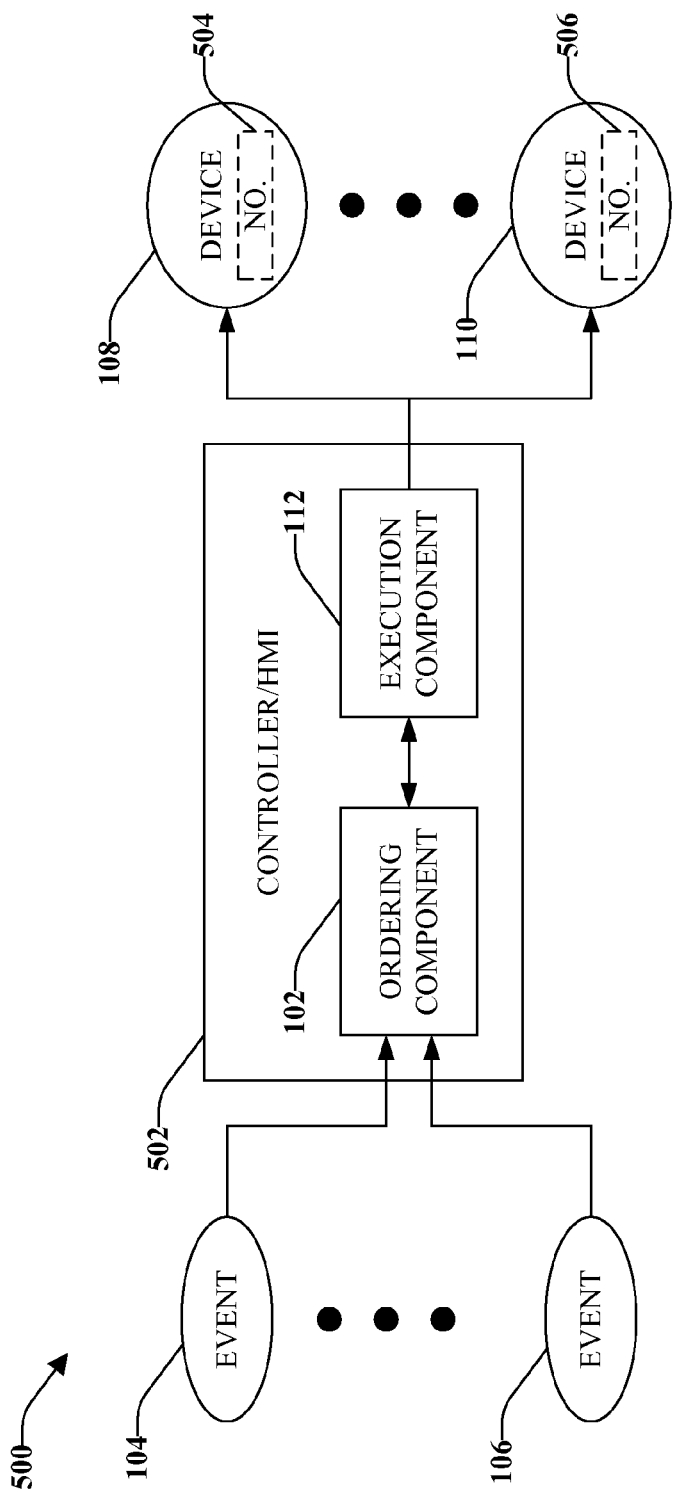
FIG. 5 illustrates a system where ordering of events can occur within a controller, an HMI, and/or a combination controller/HMI.

Turning now to FIG. 5, a system 500 is illustrated that facilitates execution of events in a particular order. The system 500 includes a controller/HMI 502, which can be a stand-alone controller, a stand-alone HMI, or a combination controller/HMI. The controller/HMI 502 can include the ordering component 102, which can receive the plurality of events 104-106. While shown as being received externally from the controller/HMI 502, it is understood that at least one of the events 104-106 can be generated internally with respect to the controller/HMI 502. For instance, if the controller/HMI 502 displays graphical push buttons and one of such buttons is selected or depressed, then an event would be generated internal to the controller/HMI 502. In another example, a change in a process variable can originate externally from the controller/HMI 502.

As described above, the ordering component 102 receives the events 104-106 and orders such events according to an organization of devices 108-110. For example, each of the devices 108-110 can be associated with numbers 504-506 that identify an order of the devices, and thus an order of desired execution of events. In more detail, and as discussed supra, an event can be associated with one of the devices 108-110, and can be arranged according to the organization (numbering) of the devices. It is understood that other manners besides numbering can be utilized to organize the devices 108-110 including letters, a combination of alphabetical and numerical characters, etc. Additionally, while illustrated as residing external to the controller/HMI 502, it can be ascertained that one or more of the devices 108-110 can be internal to the controller/HMI 502. For instance, the device 108 can be a graphical device used to illustrate a variable. Similarly, the device 110 may be a converter inside the controller/HMI 502. The ordering component 102 receives the events 104-106 and places them in an appropriate order (e.g., places them within a queue in an appropriate order). The execution component 112 then executes the ordered events with respect to appropriate device(s).

Figure 6:
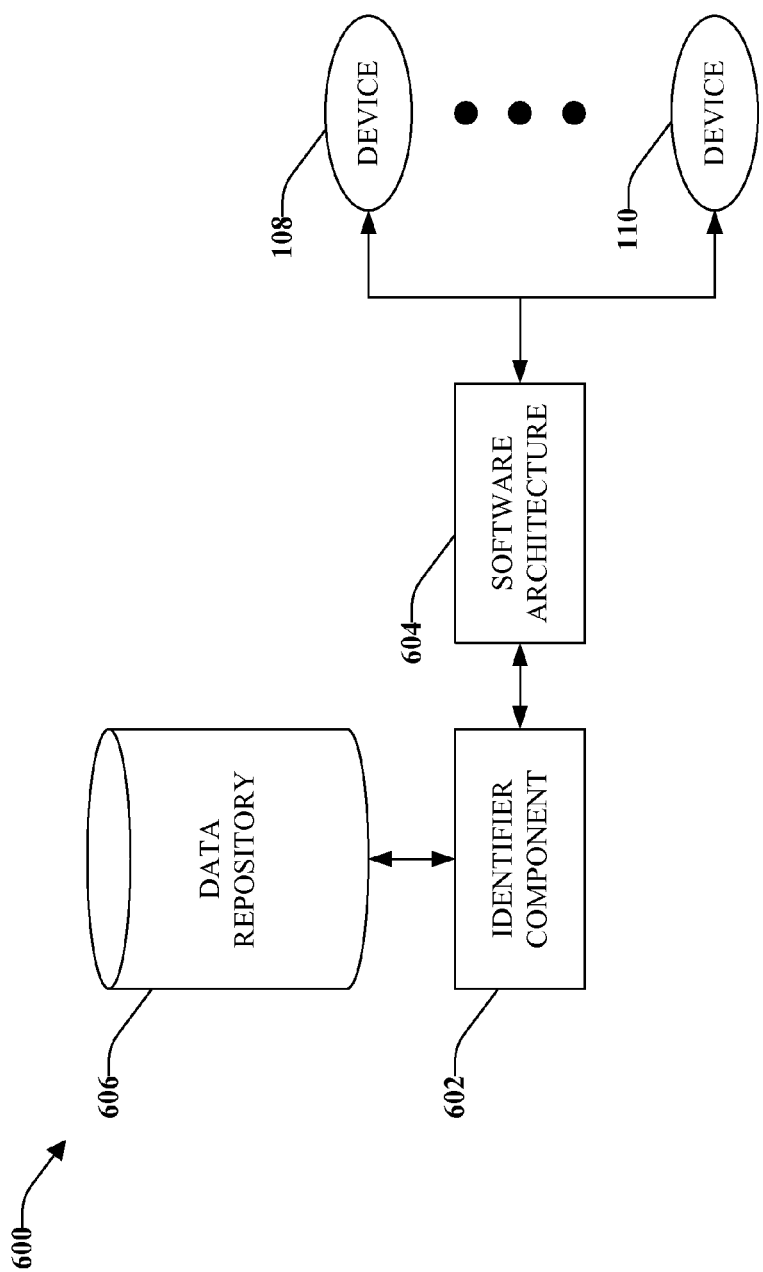
FIG. 6 illustrates a system that facilitates automatically organizing devices to enable dynamic ordering of events.

Now referring to FIG. 6, a system 600 for identifying and organizing the devices 108-110 such that events are executed in an appropriate order is illustrated. The system 600 includes an identifier component 602, which can analyze a software architecture 604 to determine a manner in which the devices are "wired up." For instance, the devices 108-110 can be wired with respect to the software architecture 604 in such a manner that the identifier component 602 can analyze the software architecture 604 to determine a desired organization (order with respect the devices should execute events). This organization can then be retained within a data repository 606, which can be accessed by the ordering component 102 (FIG. 1). Additionally or alternatively, firmware or memory of the devices 108-110 can be populated with a number, letters, and/or a combination thereof to identify the devices 108-110 and organize such devices 108-110.

Figure 7:
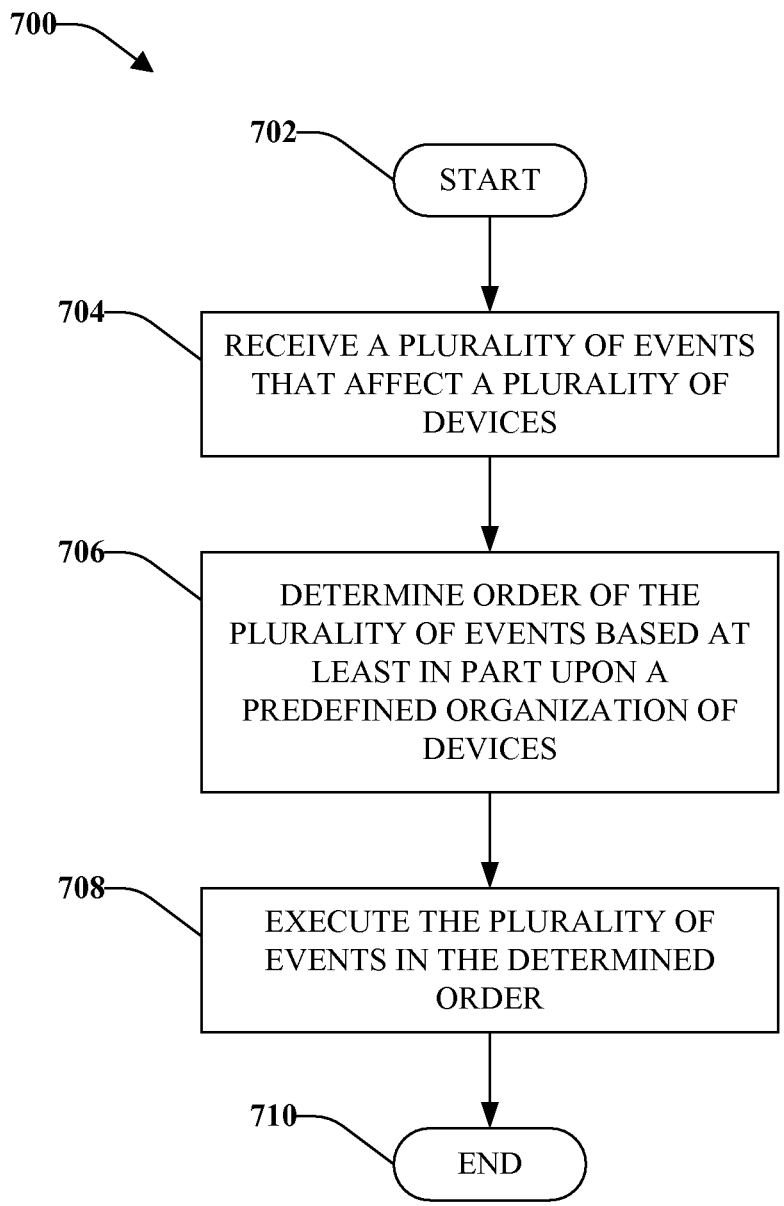
FIG. 7 is a representative flow diagram that illustrates a methodology for executing events in a particular order within a data-driven architecture.
Figure 8:
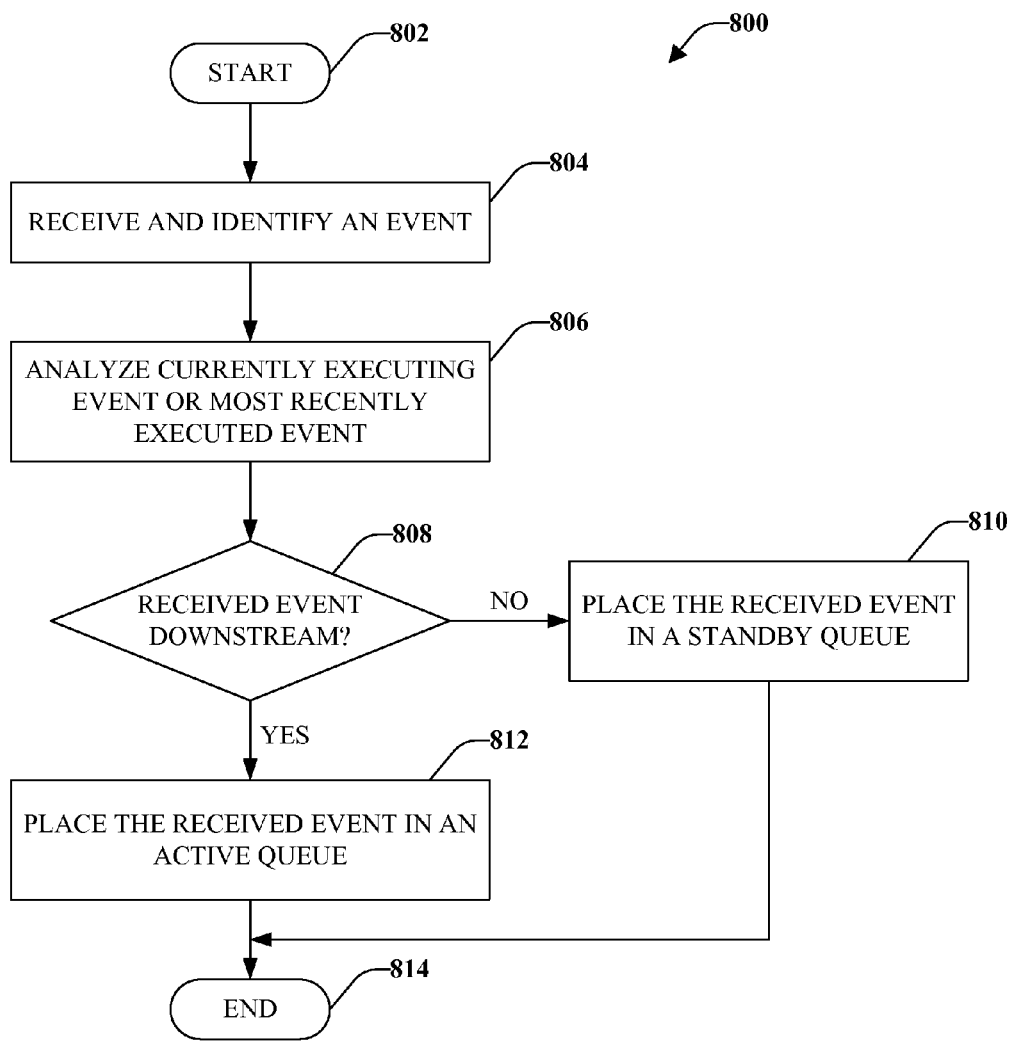
FIG. 8 is a representative flow diagram that illustrates a methodology for determining whether to replace a received event in an active queue or a standby queue.
Figure 9:
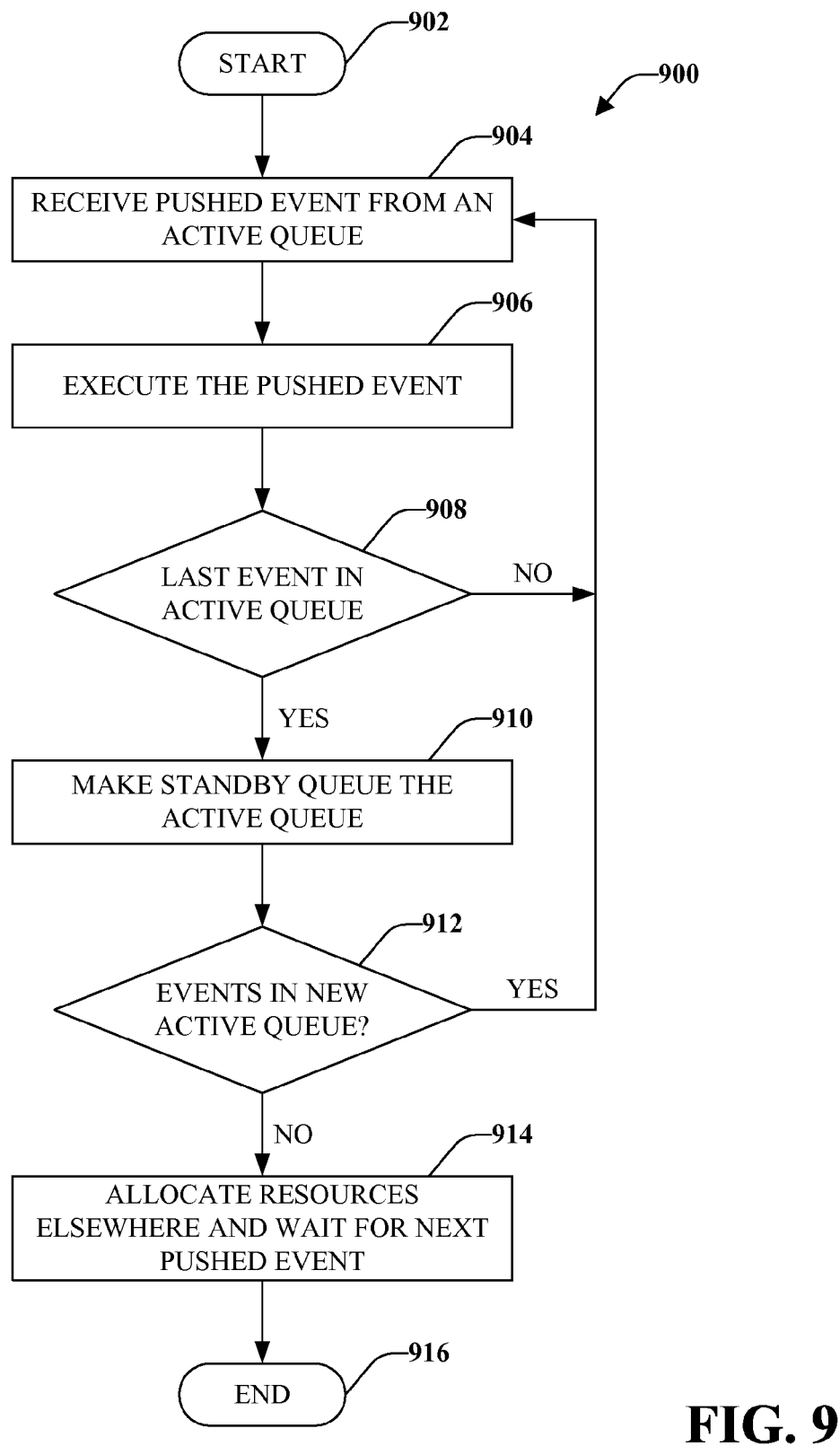
FIG. 9 is a representative flow diagram that illustrates a methodology for switching between an active queue and a standby queue.

Turning to FIGS. 7-9, methodologies relating to execution of events in a specified order are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Now turning to FIG. 7, a methodology 700 for executing a plurality of events in a particular order is illustrated. The methodology 700 enables benefits of data-driven architectures combined with reliability of conventional scanning architectures. The methodology 700 starts at 702, and at 704 a plurality of events are received, wherein each of the events affects a particular device. One or more events can originate due to human action, one or more events can originate due to change in a process variable, etc. For instance, depression of a push button can cause three devices to take action, wherein the three devices should act in a particular order.

At 706, an order of execution with respect to the plurality of received events is determined based at least in part upon a predefined organization of devices that are affected by the events. More particularly, devices can be organized (e.g., assigned numbers, letters, . . . ) based upon their association with one another. In an example, an adder may desirably execute prior to a converter executing upon an operator depressing a push button. In conventional methods associated with data-driven architectures, events can be executed out of order, resulting in various undesirable conditions. The organization of devices (which can be based upon how software is wired up) enables events to be ordered such that they execute (cause devices to act) in a desired manner. At 708, the plurality of events are executed in the predetermined order, and the methodology 700 completes at 710. The methodology 700 can be executed within or in association with a controller, an HMI, a combined controller/HMI, as well as other consumer electronics.

Now referring to FIG. 8, a methodology 800 for determining where to place a received event within one or more queues is illustrated. In more detail, the methodology 800 relates to determining whether to place a received event within an active queue or a standby queue as well as where in a selected queue the received event is to be placed. The methodology 800 can be undertaken within an industrial system, as well as within networking technology, such as a switch, a router, a gateway, and/or the like. The methodology 800 begins at 802, and at 804 an event is received and identified. More particularly, the event can be associated with a device upon which the event will have an affect. For example, the event can be identified as affecting an adder.

At 806, a currently executing event or a most recently executed event is analyzed, wherein the analysis is performed to determine where the received event should be ordered with respect to such event. At 808, a determination is made regarding whether the event is downstream (e.g., whether the event should be ordered before or after a most recently executed event or a currently executing event). If the received events is not downstream from the currently executing event or most recently executed event, then the received event can be placed within a standby queue at 810 (such that events are not executed out of order). If the received event is downstream from the currently executing event or most recently executed event, then the received event can be placed within an active queue at 812. The methodology 800 then completes at 814.

Now turning to FIG. 9, a methodology 900 for switching between an active queue and a standby queue is illustrated. The methodology 900 starts at 902, and at 904 an event is received from an active queue, wherein the event can be pushed from such queue. Alternatively, while not shown, the event can be pulled from the active queue. At 906, the pushed event is executed such that a device performs a desired task (based upon, for instance, operator action, a change in a process variable, etc.).

At 908, a determination is made regarding whether the received event is the last event within the active queue (e.g., there are no further events to be pushed or pulled from the active queue). If the executed event is not the last event within the active queue, then the methodology 900 returns to act 904. If the executed event is the last event within the active queue, then at 910 a standby queue and the active queue are switched. In other words, the standby queue becomes the active queue (the new active queue) and the now empty active queue becomes the standby queue. Thus, events are pushed or pulled from the new active queue, and the new standby queue is utilized to retain "upstream" events. At 912, a determination is made regarding whether there are any events in the new active queue. If there are one or more events, then the methodology 900 returns to act 904. If there are no events in the new active queue (e.g., both queues are empty), then at 914 resources are allocated elsewhere while waiting for a subsequent event to occur. The methodology 900 then completes at 916.

Figure 10:
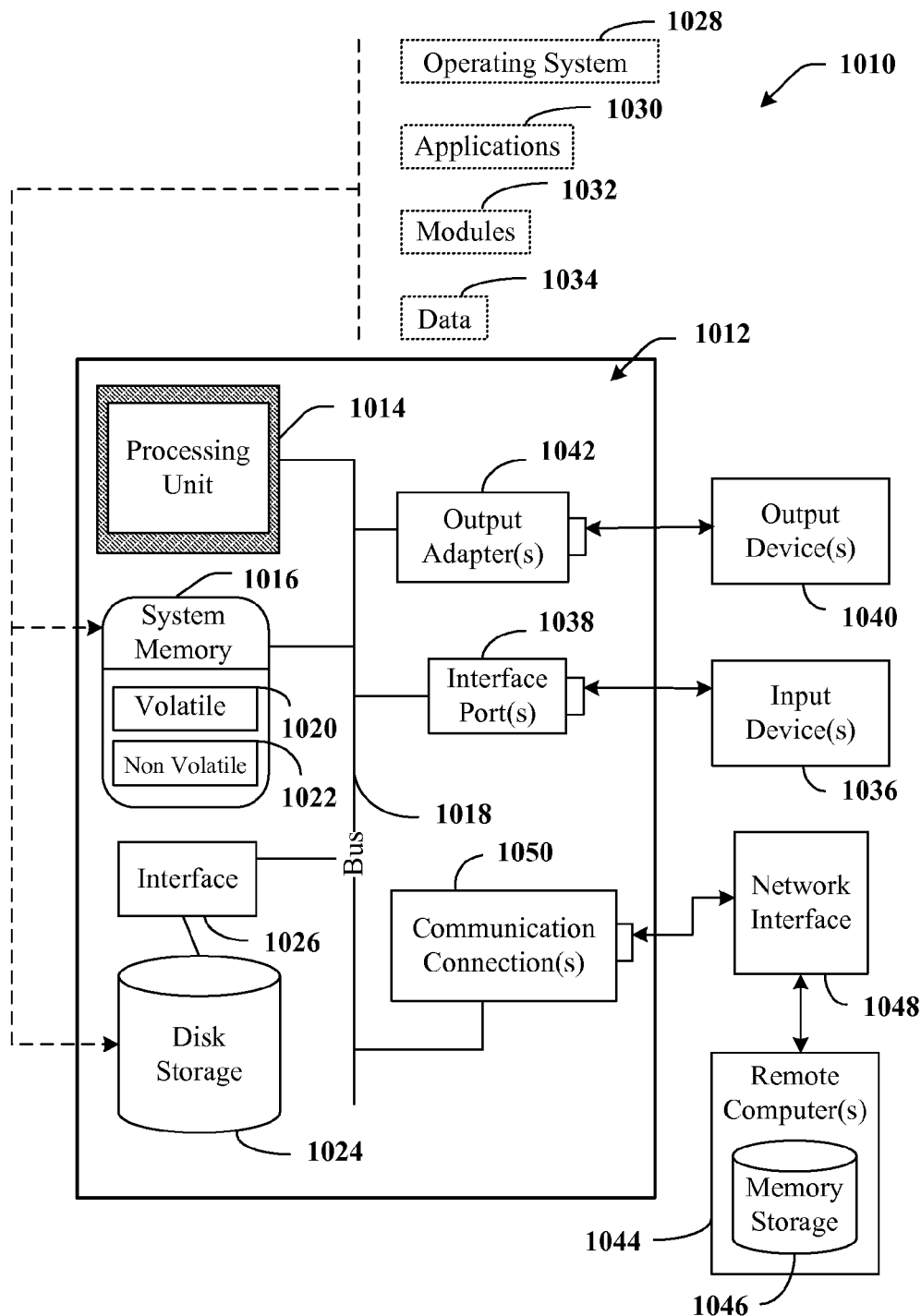
FIG. 10 is an example computing environment.

With reference to FIG. 10, an example environment 1010 for implementing various aspects of the aforementioned subject matter, including selectively ordering a plurality of events based at least in part upon a predefined organization of devices associated therewith, includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable PROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
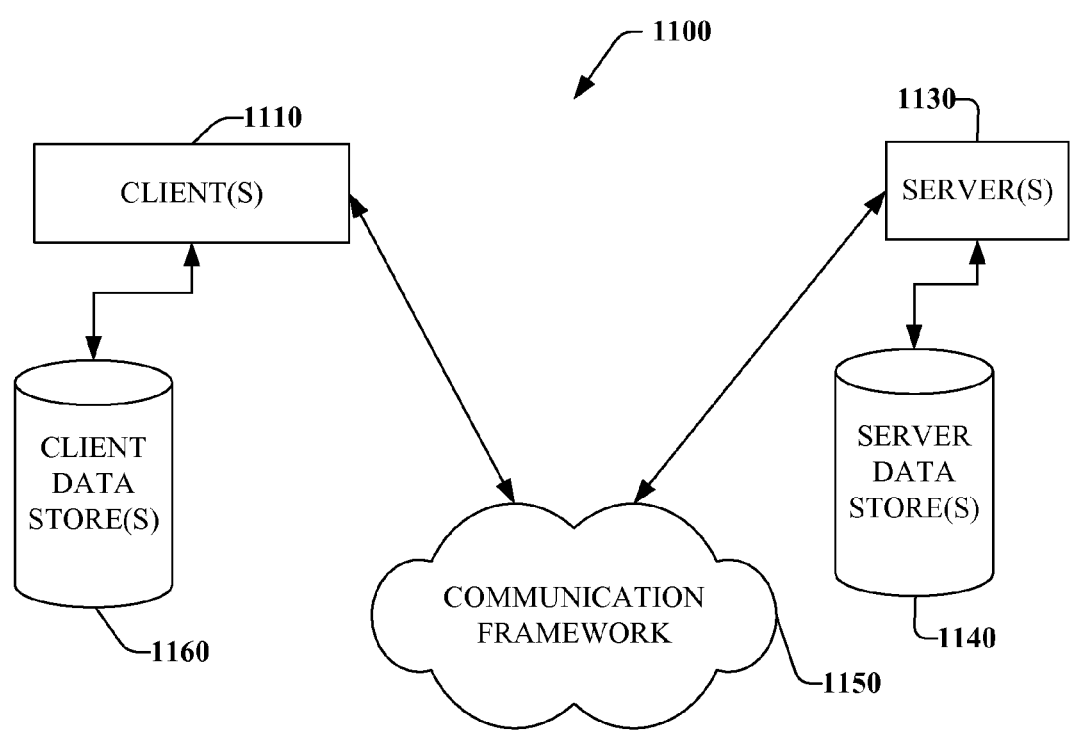
FIG. 11 is an example networking environment.

FIG. 11 is a schematic block diagram of a sample-computing environment 1100 with which the disclosed subject matter can interact. The system 1100 includes one or more client (s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the subject invention, for example. One possible communication between a client 1110 and a server 1130 can be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   determining, by an industrial automation system comprising a processor, organization data indicative of an organization of devices deployed within the industrial automation system based on an order in which the devices are to execute respective events;
   receiving, in a random order, a set of the respective events;
   selecting, based on a result of a comparison between a first event of the set of the respective events and a second event that is most recently executed by a device of the devices, a queue in which information representing the first event is to be stored, wherein the queue is selected from an active queue and a standby queue; and
   organizing the information in relation to disparate event data within the queue to facilitate an execution of the set of the respective events in an order that is determined based on the organization data.

2. The method of claim 1, wherein the receiving the set of respective events comprises receiving the set of respective events in response to determining that a process variable associated with the industrial automation system has been modified.

3. The method of claim 1, wherein the selecting comprises selecting the active queue in response to determining that the first event is downstream from the second event.

4. The method of claim 1, further comprising: analyzing architecture data indicative of a software architecture related to the industrial automation system to facilitate the determining of the organization data, wherein the software architecture represents a connection between a first device of the devices and a second device of the devices.

5. An industrial automation system, comprising:
   a memory configured to store computer-executable components; and
   a processor, communicatively coupled to the memory, configured to execute or facilitate execution of the computer-executable components, the computer-executable components comprising:
       an identifier component configured to determine organization data indicative of an organization of devices within the industrial automation system, wherein the organization data is determined based on an order in which the devices are to execute respective events,
       an ordering component configured to receive, in a random order, a set of the respective events; and
       a placement component that selects, based on a result of a comparison between a first event of the set of the respective events and a second event that is most recently executed by a device of the devices, a queue in which information representing the first event is to be stored, wherein the queue is selected from an active queue and a standby queue and wherein the ordering component is further configured to organize the information in relation to disparate event data within the queue to facilitate an execution of the set of the respective events in an order that is determined based on the organization data.

6. The industrial automation system of claim 5, wherein the first event is received in response to a determination of a change in a process variable associated with the industrial automation system.

7. The industrial automation system of claim 5, wherein the identifier component is further configured to rank the devices based on interoperation data indicative of an interoperation of the devices and wherein the organization data is determined based on the ranking of the devices.

8. The industrial automation system of claim 5, wherein the placement component is configured to select the active queue and the computer-executable components further comprise:
   a pulling component configured to request the information from the active queue and, in response to determining that the information is received, direct the information to an execution component that is configured to facilitate an execution of the event.

9. The industrial automation system of claim 5, wherein the placement component is configured to select the active queue and the computer-executable components further comprise:
   a pushing component configured to initiate a transmission of the information from the active queue to an execution component that is configured to facilitate an execution of the event.

10. The industrial automation system of claim 5, wherein the placement component is configured to select the active queue and the computer-executable components further comprise:
    a monitor component configured to verify that a defined event of the set of the respective events has been executed prior to executing the first event.

11. The industrial automation system of claim 10, wherein the monitor component is further configured to monitor a device of the devices associated with the defined event to verify that the device has executed the event.

12. The industrial automation system of claim 5, wherein the comparison comprises a determination that the first event is downstream from the second event and wherein the placement component selects the active queue in response to the determination.

13. The industrial automation system of claim 5, wherein the comparison comprises a determination that the first event is upstream from the second event and wherein the placement component selects the standby queue in response to the determination.

14. The industrial automation system of claim 5, wherein the computer-executable components further comprise:
    a queue selector component configured to switch the active queue and the standby queue to activate the standby queue and deactivate the active queue in response to verifying that all events represented within the active queue have been executed, wherein other events represented within the standby queue are executed in response to the standby queue being determined to be activated.

15. A non-transitory computer readable storage medium comprising computer-executable instructions that, in response to execution, cause an industrial automation system comprising a processor, to perform operations, comprising:

determining organization data that represents an interconnection of devices deployed within the industrial automation system, wherein the organization data is utilized to specify an order in which respective events are to be performed by the devices;

subsequent to receiving, in a random order, a set of the respective events, selecting, based on a result of a comparison between a first event of the set of the respective events and a second event that is most recently executed by a device of the devices, a queue in which information representing the first event is to be stored, wherein the queue is selected from an active queue and a standby queue; and organizing the information in relation to disparate event data within the queue to facilitate an execution of the set of the respective events in an order that is determined based on the organization data.

16. The non-transitory computer readable storage medium of claim 15, wherein the selecting comprises selecting the active queue in response to determining that the first event is downstream from the second event.

17. The non-transitory computer readable storage medium of claim 16, wherein the selecting comprises selecting the standby queue in response to determining that the first event is upstream from the second event.

18. An event execution system, comprising:

a memory configured to store computer-executable instructions; and a processor, communicatively coupled to the memory, configured to execute or facilitate execution of the computer-executable instructions to perform operations, comprising:

determining, in a random order, events that are to be executed by devices deployed within an industrial automation system, based on comparing a first event of the events with a second event that has been most recently executed by a device of the devices, selecting a queue from an active queue and a standby queue, and storing information representing the first event in the selected queue, wherein the storing comprises organizing the information in relation to disparate event data within the selected queue to facilitate an execution of the events in an order that is determined based on organization data, wherein the organization data that represents an organization of the devices within the industrial automation system and is determined based on a manner in which the devices are to execute the events.

19. The event execution system of claim 18, wherein the operations further comprise:

facilitating a first execution a first set of the events represented within the active queue prior to a second execution of a second set of the events represented within the standby queue.

20. An industrial controller comprising the industrial automation system of claim 5.

21. A human-machine interface comprising the industrial automation system of claim 5.

22. A combination controller and human-machine interface comprising the industrial automation system of claim 5.

* * * * *